(12) United States Patent
Abroy

(10) Patent No.: US 10,439,371 B1
(45) Date of Patent: Oct. 8, 2019

(54) SNAPPED IN ROTATING ARC HOUSING ASSEMBLY FOR SAFETY SWITCH

(71) Applicant: SCHNEIDER ELECTRIC USA, INC., Andover, MA (US)

(72) Inventor: Hamid S. Abroy, Lexington, KY (US)

(73) Assignee: Schneider Electric USA, Inc., Andover, MA (US)

( * ) Notice: Subject to any disclaimer, the term of this patent is extended or adjusted under 35 U.S.C. 154(b) by 0 days.

(21) Appl. No.: 16/015,471

(22) Filed: Jun. 22, 2018

(51) Int. Cl.
| H01H 21/56 | (2006.01) |
| H01H 33/08 | (2006.01) |
| H01H 33/46 | (2006.01) |
| H01H 33/53 | (2006.01) |
| H02B 1/32 | (2006.01) |
| H02B 1/38 | (2006.01) |

(52) U.S. Cl.
CPC ............ H02B 1/32 (2013.01); H01H 33/46 (2013.01); H01H 33/53 (2013.01); H02B 1/38 (2013.01); H01H 21/56 (2013.01); H01H 33/08 (2013.01); H01H 2223/012 (2013.01); H01H 2223/018 (2013.01)

(58) Field of Classification Search
CPC .......... H01H 33/46; H01H 33/53; H01H 9/20; H01H 9/30; H01H 3/00; H01H 21/54; H01H 21/00; H01H 21/06; H01H 21/10; H01H 33/08; H01H 2223/012; H01H 2223/018; H02B 1/38; H02B 1/36
USPC ........... 200/50.12, 50.13, 50.28, 15; 218/149
See application file for complete search history.

(56) References Cited

U.S. PATENT DOCUMENTS

| 2,563,441 A | 8/1951 | Woods |
| 3,121,144 A | 2/1964 | Tjebben |
| 3,142,003 A | 7/1964 | Olashaw |
| 3,610,850 A | 10/1971 | Eichelberger |
| 4,033,660 A | 7/1977 | Ericson et al. |

(Continued)

FOREIGN PATENT DOCUMENTS

| DE | 102011000837 | 8/2012 |
| EP | 2110826 | 1/2011 |
| WO | WO2011000838 | 1/2011 |

OTHER PUBLICATIONS

Model 6 Export Motor Control Centers, Bulletin No. 80446-300-01A, Square D Company, Oct. 2001.

*Primary Examiner* — Truc T Nguyen
*Assistant Examiner* — William A Bolton
(74) *Attorney, Agent, or Firm* — Locke Lord LLP

(57) ABSTRACT

The invention disclosed is an arc protection system for an electrical switch mounted in an electrical cabinet. The system includes an arc suppression housing pivotally mounted in the electrical cabinet. The housing comprises an arc extinguishing chamber having an opening configured to face separable contacts of an electrical switch mounted in the cabinet when the housing has been rotated about the pivot into a closed position. The arc extinguishing chamber is configured to extinguish an electric arc produced by opening the separable contacts when the housing is in the closed position. The system further includes an interference mechanism mounted on the arc suppression housing. The interference mechanism is configured to prevent closure of an access door of the electrical cabinet, when the housing has been rotated about the pivot into an open position configured to enable operator access to the separable contacts of the electrical switch.

12 Claims, 8 Drawing Sheets

(56) References Cited

U.S. PATENT DOCUMENTS

| | | | |
|---|---|---|---|
| 4,034,170 A * | 7/1977 | Raabe | H01H 9/20 200/330 |
| 4,038,585 A | 7/1977 | Wolski | |
| 4,038,626 A * | 7/1977 | Haydu | H01H 9/44 335/132 |
| 4,090,230 A | 5/1978 | Fuller | |
| 4,139,748 A | 2/1979 | Wolfe et al. | |
| 4,405,844 A * | 9/1983 | Dizon | H01H 21/06 200/50.12 |
| 4,486,815 A | 12/1984 | Takahashi | |
| 4,789,919 A | 12/1988 | Cox et al. | |
| 4,926,286 A | 5/1990 | Maki | |
| 5,343,355 A | 8/1994 | Ishikawa | |
| 5,486,663 A | 1/1996 | Fritsch et al. | |
| 5,497,287 A | 3/1996 | Yee | |
| 5,510,960 A | 4/1996 | Rosen | |
| 5,800,028 A | 9/1998 | Smith et al. | |
| 6,313,416 B1 * | 11/2001 | Abroy | H01H 1/42 200/15 |
| 6,331,684 B1 | 12/2001 | Abroy | |
| 6,337,449 B1 | 1/2002 | Brouillat et al. | |
| 6,388,868 B1 * | 5/2002 | Leccia | H02B 11/133 200/50.12 |
| 6,414,839 B1 | 7/2002 | Derksen | |
| 6,472,971 B2 | 10/2002 | Toyana et al. | |
| 6,486,421 B1 | 11/2002 | Jones et al. | |
| 6,954,060 B1 | 10/2005 | Edel | |
| 7,795,551 B2 | 9/2010 | Narayanan et al. | |
| 8,305,739 B2 | 6/2012 | Dozier | |
| 8,242,395 B2 | 8/2012 | Josten et al. | |
| 8,331,081 B2 | 12/2012 | Abrahamsen et al. | |
| 8,333,600 B2 | 12/2012 | Yanniello | |
| 8,476,546 B2 | 7/2013 | Abroy | |
| 8,476,992 B2 | 7/2013 | Yang et al. | |
| 8,514,551 B2 | 8/2013 | Cosley | |
| 9,123,488 B2 | 9/2015 | Seo | |
| 9,391,416 B1 | 7/2016 | Wronski et al. | |
| 2006/0067018 A1 | 3/2006 | Malkowski, Jr. et al. | |
| 2007/0111575 A1 | 5/2007 | Jensen | |
| 2008/0023211 A1 | 1/2008 | Yee | |
| 2008/0079436 A1 | 4/2008 | Gollhardt et al. | |
| 2008/0258667 A1 | 10/2008 | Morris et al. | |
| 2009/0000926 A1 | 1/2009 | Buxton et al. | |
| 2010/0024191 A1 | 2/2010 | Ledbetter | |
| 2010/0008492 A1 | 4/2010 | Banting et al. | |
| 2010/0118473 A1 | 5/2010 | Morris et al. | |
| 2010/0280775 A1 | 11/2010 | Schafer et al. | |
| 2011/0110049 A1 | 5/2011 | Lehtola et al. | |
| 2011/0149480 A1 | 6/2011 | Leeman et al. | |
| 2011/0252845 A1 | 10/2011 | Webb et al. | |
| 2012/0013227 A1 | 1/2012 | Josten et al. | |
| 2012/0039061 A1 | 2/2012 | McBee et al. | |
| 2012/0064746 A1 | 3/2012 | Bellows et al. | |
| 2012/0097413 A1 | 4/2012 | Bugaris | |
| 2012/0127636 A1 | 5/2012 | Abrahamsen et al. | |
| 2012/0228097 A1 | 9/2012 | Gemme et al. | |
| 2012/0314340 A1 | 12/2012 | Faber et al. | |
| 2013/0279083 A1 | 10/2013 | Faber | |
| 2015/0171605 A1 | 6/2015 | Jo et al. | |
| 2016/0036204 A1 | 2/2016 | Schroeder | |
| 2016/0322790 A1 | 11/2016 | Becerra Becerra | |

\* cited by examiner

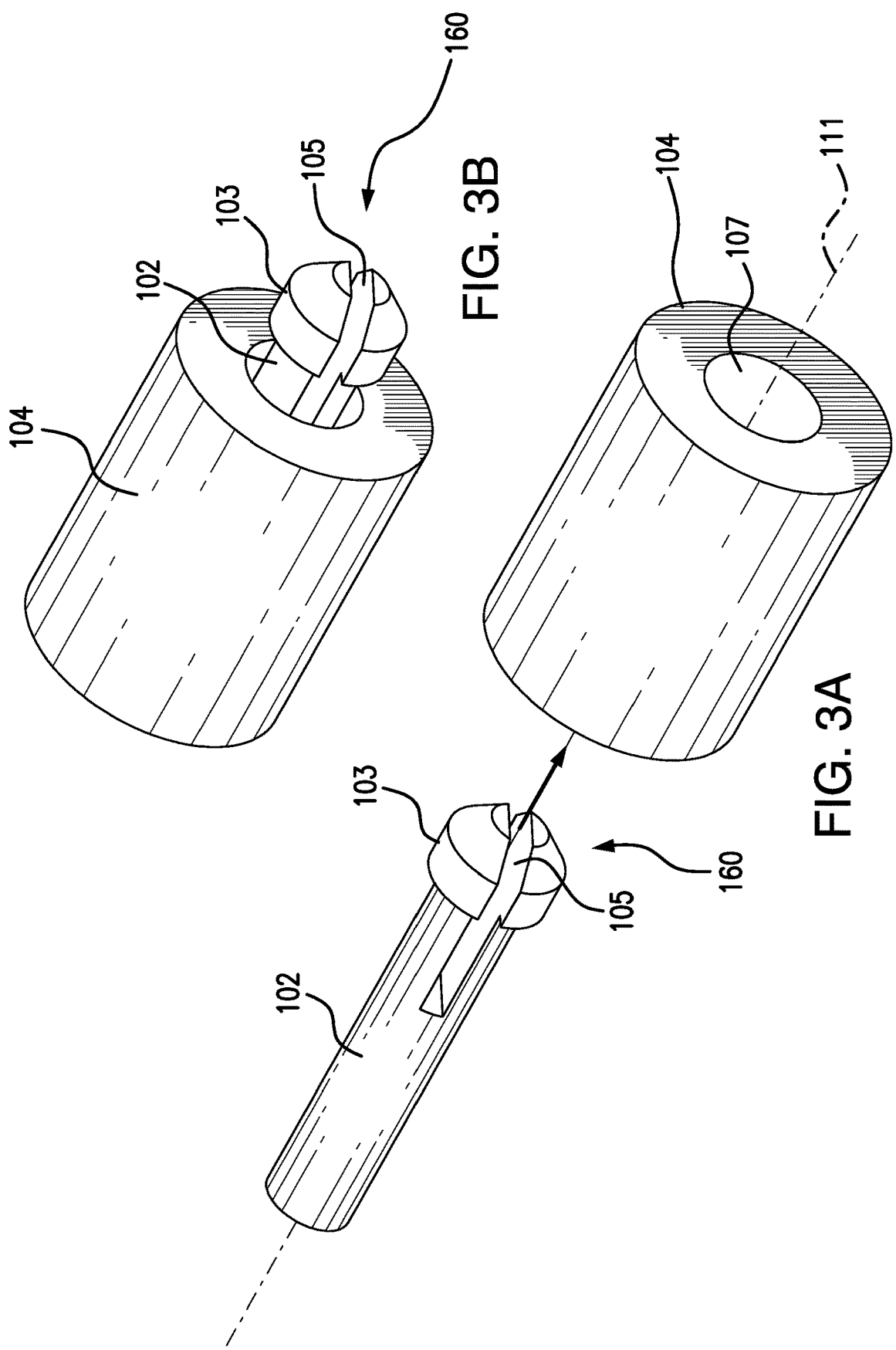

SNAPPED IN ROTATING ARC HOUSING ASSEMBLY FOR SAFETY SWITCH

FIELD OF THE INVENTION

The invention disclosed relates to controlling arc flash in electrical switches.

BACKGROUND

Electrical switches make and break connections with incoming power conductors in switchgear handling heavy currents powering large motors in industrial and commercial settings. The switching of heavy currents produces arcing between the switch contacts, having the potential to cause considerable damage to the contacts and injury to operators. An arc flash is the rapid release of energy due to an arcing fault between phases, neutral or ground contacts. At the start of opening an electrical switch, the area of the switch contacts that carries the electrical current diminishes, causing resistive heating and melting of the metal contact material in that area. When the contacts begin to actually separate, the electrical field strength in the small gap between the contacts is quite large and causes the air molecules to ionize, forming a plasma. The positively charged ions and negative electrons of the plasma are accelerated in the high electric field toward the respective contacts of opposite polarity and strike the metallic surfaces, causing spallation, evaporation and ionization of the metal atoms. An arc then forms between the contacts, along the conductive path created by the plasma and metal vapor. Metal atoms are eroded and ionized from the contact with the more positive potential, and are accelerated toward and deposited on the contact with the more negative potential (that temporarily exist at that particular moment in an AC cycle), resulting in arc erosion. The resulting arc flash has the potential to cause considerable damage, including arcing-induced erosion of the contacts and injury to operators. The temperature of an arc flash may be capable of vaporizing metal and sending a blast of plasma and molten metal in all directions with extreme force. Damage may be caused to the switchgear both by the explosion of the arc flash and by the heat radiating from the blast. It is important to minimize the potential for harm to equipment and people by containing and redirecting the arc energy out from the switchgear.

Safety switches generally include an enclosure or electrical cabinet having a door that is pivotally mounted to the front of the cabinet to provide access to separable contacts of an electrical switch mounted inside the cabinet. An example of separable contacts of an electrical switch may be seen in blade or knife-type electrical switches. The circuit for each phase being switched is completed through a pivotable, electrically conductive knife or blade that engages a corresponding pair of electrically conductive jaws to electrically connect the line current to the load. The blade and the jaws form the separable contacts of the electrical switch. In a safety switch, the blade-type switch is mounted in an electrical cabinet, which may incorporate an insulating base to carry an incoming line terminal for each phase. An example of such blade-type electrical switch is disclosed, for example, in U.S. Pat. No. 6,331,684, to Hamid S. Abroy et al., which is incorporated herein by reference. A handle or other actuator may be mounted to the exterior of the cabinet to move the blade to connect or disconnect it with the jaws of the electrical switch. In some currently designed safety switches, the point of separation of the blade from the jaws takes place in a small area on the blade, causing resistive heating and melting of the metal contact material in that area. When the contacts begin to actually separate, an arc flash forms between the contacts, explosively disbursing a plasma and hot metal vapor. The arc flash may be guided through an arc suppression housing to attenuate, suppress and extinguish the arc flash.

An example of an arc suppression housing that provides capability to passively attenuate and extinguish arc flash events, is described in U.S. Pat. No. 8,476,546, to Hamid S. Abroy et al., which is incorporated herein by reference. A switch assembly includes an arc suppressing housing mounted in an electrical cabinet. The arc suppressing housing has opposing walls forming an arc extinguishing chamber, with an elongated notch in one wall that is shaped and sized to allow the electrically conductive knife or blade of the switch to freely pass through the arc suppressing housing and engage the electrically conductive jaws. The arc suppressing housing has a plurality of shelves between the opposing sidewalls. A plurality of arc suppressing plates extend through the housing and are seated on the shelves. The arc suppression housing and blades effectively surround the blade and jaws to quench electrical arc flashes released when the blade engages or disengages the jaws and to protect the other components in the switch assembly. The arc suppressing plates are configured to extinguish electrical arc flashes between the blade and the jaws.

Arc suppression housings are an important part of a safety switch, but typically are removed by installers in the field for wiring attachment to the terminals of the switch. Wiring diagrams and warning labels may be provided to remind the installer to re-install the housing, but such warnings are not 100% full proof and the arc suppression housings may be misplaced or not properly re-installed in the switch.

SUMMARY

The invention disclosed is an arc protection system for an electrical switch mounted in an electrical cabinet. The system includes an arc suppression housing that is pivotally mounted on a pivot in the electrical cabinet to enable an operator to reach the contacts of the electrical switch for wiring or maintaining the contacts. The housing comprises an arc extinguishing chamber having an opening configured to face separable contacts of an electrical switch mounted in the cabinet when the housing has been rotated about a pivot axis of the pivot into a closed position. The arc extinguishing chamber is configured to extinguish an electric arc flash produced by opening the separable contacts when the housing is in the closed position. The system further includes an interference mechanism mounted on the arc suppression housing. The interference mechanism is configured to prevent closure of an access door of the electrical cabinet, after the housing has been rotated about the pivot axis of the pivot into an open position configured to enable operator access to the separable contacts of the electrical switch.

The arc suppression housing prevents the access door from closing, which insures the arc suppression housing will always be in place while the switch is in operation. The arc suppression housing may be rotated out of place for initial wiring of the switch and access to its terminals.

In example embodiments of the invention, the interference mechanism is an extension projecting from the arc suppression housing, configured to block closure of the access door of the electrical cabinet, to insure the operator closes the arc suppression housing into the closed position, before closure of the access door.

In example embodiments of the invention, the arc suppression housing is supported by a pivot shaft coincident with the pivot axis. A base portion is fastened to the electrical cabinet, to which the separable contacts of the electrical switch are mounted. The base portion includes a pivot socket configured to receive the pivot shaft of the arc suppression housing. The pivot socket is configured to allow the housing to be rotated about the pivot axis between the closed position and the open position.

In example embodiments of the invention, the pivot socket has a generally cylindrical shape with a cylindrical axis coincident with the pivot axis. The ends of the cylinder are generally perpendicular to the pivot axis and the cylinder has a cylindrical hole through it coincident with the pivot axis, within which the pivot shaft can be inserted. The pivot shaft has a shaft restraint device on one end, configured to allow the pivot shaft to be inserted into the hole of the pivot socket. The shaft restraint device, once inserted into the hole of the pivot socket, is further configured to restrain the pivot shaft from removal from the hole, thereby restraining the arc suppression housing from being removed from the base portion.

In example alternate embodiments of the invention, the pivot socket has a generally C-shaped cross section forming a slot opening parallel to the pivot axis and a hollow interior space coincident with the pivot axis. The slot opening enables the pivot shaft to be inserted sideways through the slot opening into the hollow interior space by movement in a direction transverse to the pivot axis. The pivot socket includes a shaft retaining device configured to allow the pivot shaft to be inserted sideways through the slot opening into the hollow interior space. The shaft retaining device is further configured to retain the pivot shaft from removal from the hollow interior space through the slot opening, thereby restraining the arc suppression housing from being removed from the base portion once the pivot shaft has been inserted sideways into the pivot socket.

In example embodiments of the invention, the interference mechanism prevents closure of the access door of the electrical cabinet, until the housing has been rotated about the pivot into the closed position.

In example embodiments of the invention, the housing further comprises a plurality of arc extinguishing chambers, each having an opening configured to face separable contacts of a corresponding plurality of electrical switches mounted in the cabinet when the housing has been rotated about the pivot into the closed position.

DESCRIPTION OF FIGURES

FIGS. 3A and 3B show a top perspective view from the right side, of an example embodiment of the invention, respectively showing a disassembled (FIG. 3A) and an assembled (FIG. 3B) arrangement of the pivot shaft and the pivot socket. The shaft restraint device is configured to allow the pivot shaft to be inserted into the pivot socket of the base portion and is further configured to restrain the pivot shaft from removal from the pivot socket, thereby restraining the arc suppression housing from being removed from the base portion once the pivot shaft has been inserted into the pivot socket.

DESCRIPTION OF EMBODIMENTS OF THE INVENTION

Figure 1:
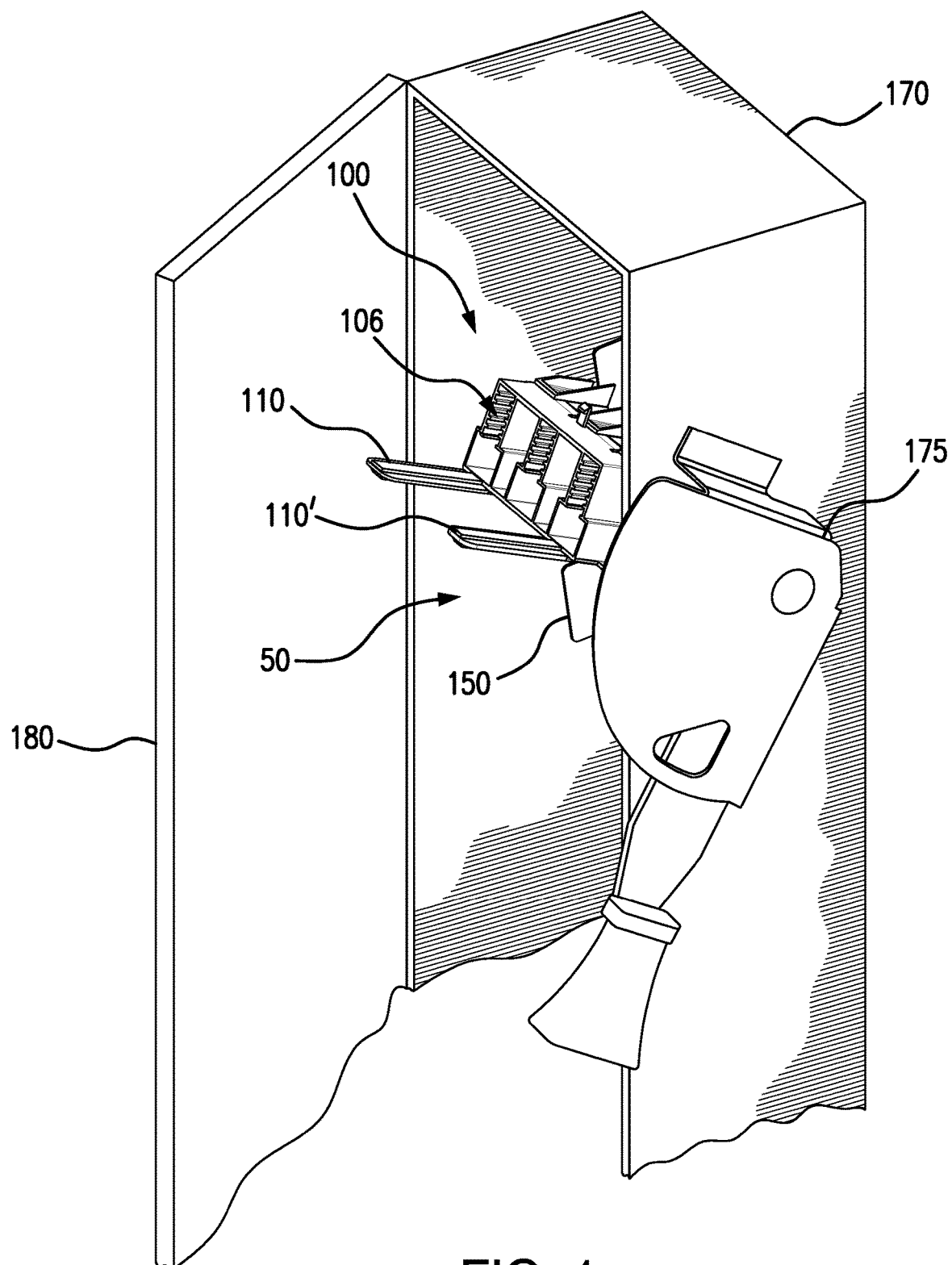
FIG. 1 shows a top perspective view from the left side, of an example embodiment of the invention, showing an electrical cabinet within which is contained a safety switch comprising an arc suppression housing that is pivotally mounted to a base within the cabinet. Electrical switch contacts are mounted in the base. The arc suppression housing may be rotated from a closed position to an open position shown in the figure, to enable operator access to the switch contacts. An access door of the cabinet is shown open in the figure. When the arc suppression housing has been rotated into its open position, closure of the access door of the cabinet is blocked by an interference projection of the arc suppression housing, which is shown extending out of the cabinet. The access door is thereby prevented from closing when the arc suppression housing is in its open position, to enable operator access to the switch contacts.

FIG. 1 shows a top perspective view from the left side, of an example embodiment of the invention, showing an electrical cabinet 170 within which is contained a safety switch 50. The safety switch 50 comprises an arc suppression housing 100 that is pivotally mounted to a base 150 within the cabinet 170. Electrical switch contacts 120 (shown in FIG. 5) of an electrical switch may be mounted in the base 150 of the arc suppression housing 100 and may be actuated by the handle 175. The arc suppression housing 100 includes a top wall 101 and opposing side walls 109A and 109B surrounding an arc extinguishing chamber 106 having a bottom opening 108 configured to face the separable contacts 120 of the electrical switch. The arc suppression housing 100 may be rotated from a closed position shown in FIG. 2 to an open position shown in FIG. 4, to enable an operator to gain access to the switch contacts 120 in the base 150 for wiring or maintaining the contacts. An access door 180 of the cabinet is shown open in FIG. 1. When the arc suppression housing 100 has been rotated into its open position, closure of the access door 180 of the cabinet is blocked by interference projections 110 and 110' of the arc suppression housing 100, which are shown extending out of the cabinet doorway. The access door 180 is thus safely prevented from being closed by an operator after the arc suppression housing 100 has been rotated by the operator into its open position.

Figure 2:
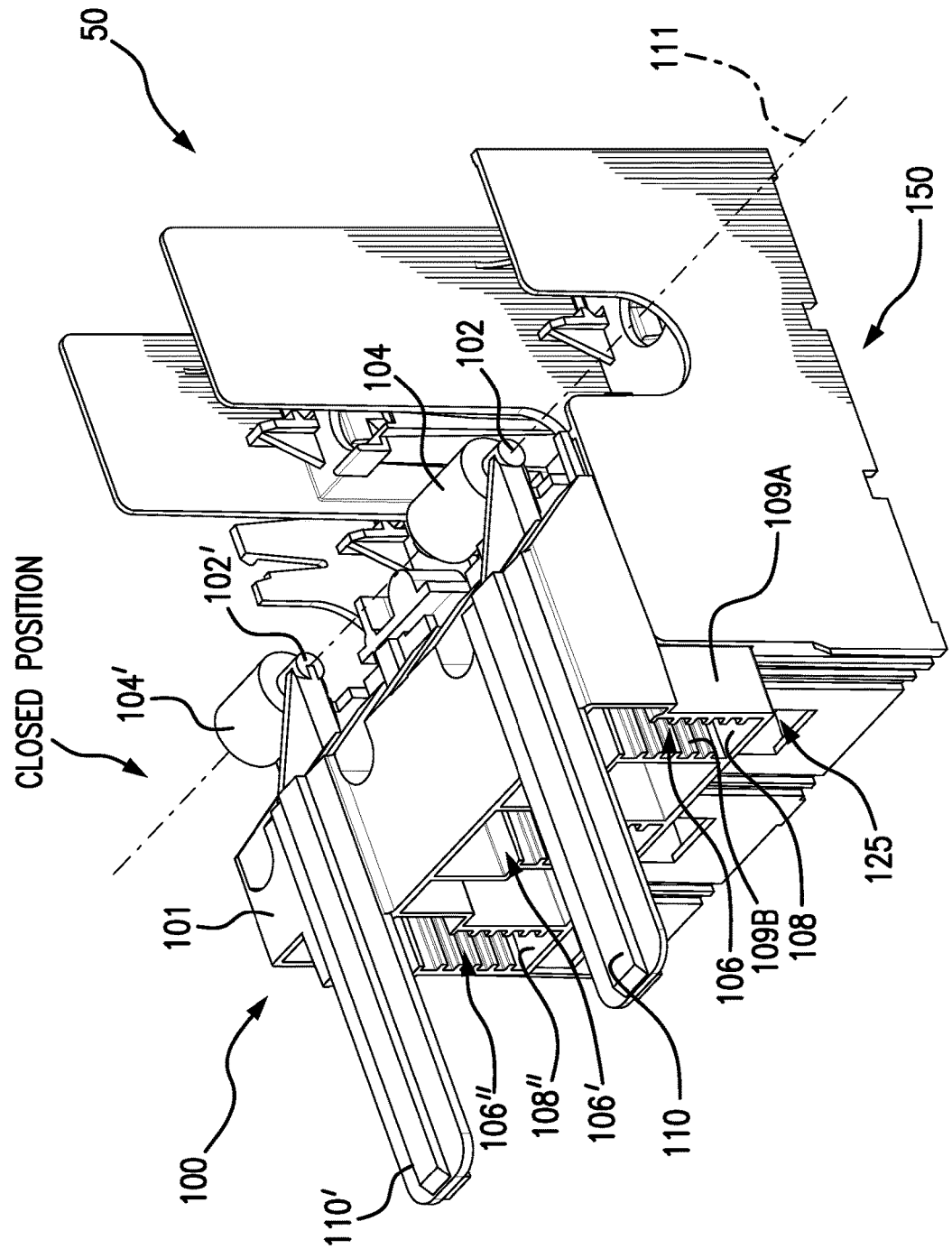
FIG. 2 shows a top perspective view from the left side, of an example embodiment of the invention, showing the closed position of the arc suppression housing and the base to which it is pivotally mounted.

FIG. 2 shows a top perspective view from the left side, of an example embodiment of the invention, showing the safety switch 50 with the closed position of the arc suppression housing 100 and the base 150 to which it is pivotally mounted. The arc suppression housing 100 is pivotally mounted on a pivot shaft 102. The pivot shaft 102 is shown inserted or snapped into a pivot socket 104 configured to receive the pivot shaft 102, to allow the arc suppression housing 100 to be rotated about a pivot axis 111 between the closed position and an open position shown in FIG. 4. The arc suppression housing 100 comprises the arc extinguishing chamber 106 having the opening 108 configured to face the separable contacts 120 (shown in FIG. 5) in the base 150 when the arc suppression housing 100 has been rotated about the pivot axis into the closed position. The arc extinguishing chamber 106 is configured to extinguish an electric arc flash produced by opening the separable contacts 120.

The bottom opening 108 in the arc extinguishing chamber 106 is shaped and sized to allow the moveable contact portion of the electrical switch, such as an electrically conductive knife or blade, to freely pass through the arc extinguishing chamber 106 and engage electrically conductive jaws contact 120 of the switch. An example of such knife or blade-type electrical switch is disclosed, for example, in U.S. Pat. No. 6,331,684, to Hamid S. Abroy et al., which is incorporated herein by reference. Wiring channel 125 is shown in the base 150, to enable wiring the electrical contacts 120 while the arc suppression housing 100 is in the open position shown in FIG. 4. The arc extinguishing chamber 106 has a plurality of shelves between the opposing sidewalls 109A and 109B. A plurality of arc suppressing plates extend through the arc extinguishing chamber 106 and are seated on the shelves, as described in U.S. Pat. No. 8,476,546, to Hamid S. Abroy et al., which is incorporated herein by reference. The arc extinguishing chamber 106 and plates effectively surround the blade and jaws contacts 120 of the electrical switch to quench electrical arc flashes released when the blade engages or disengages the jaws 120 and to protect other components in the switch assembly. The arc suppressing plates are configured to extinguish electrical arc flashes between the blade and the jaws contacts 120. The arc extinguishing chamber 106 diverts the arc flash against the arc suppressing plates, to split the arc flash up into a number of elementary arcs, to dissipate the energy of the arc flash.

Figure 3:
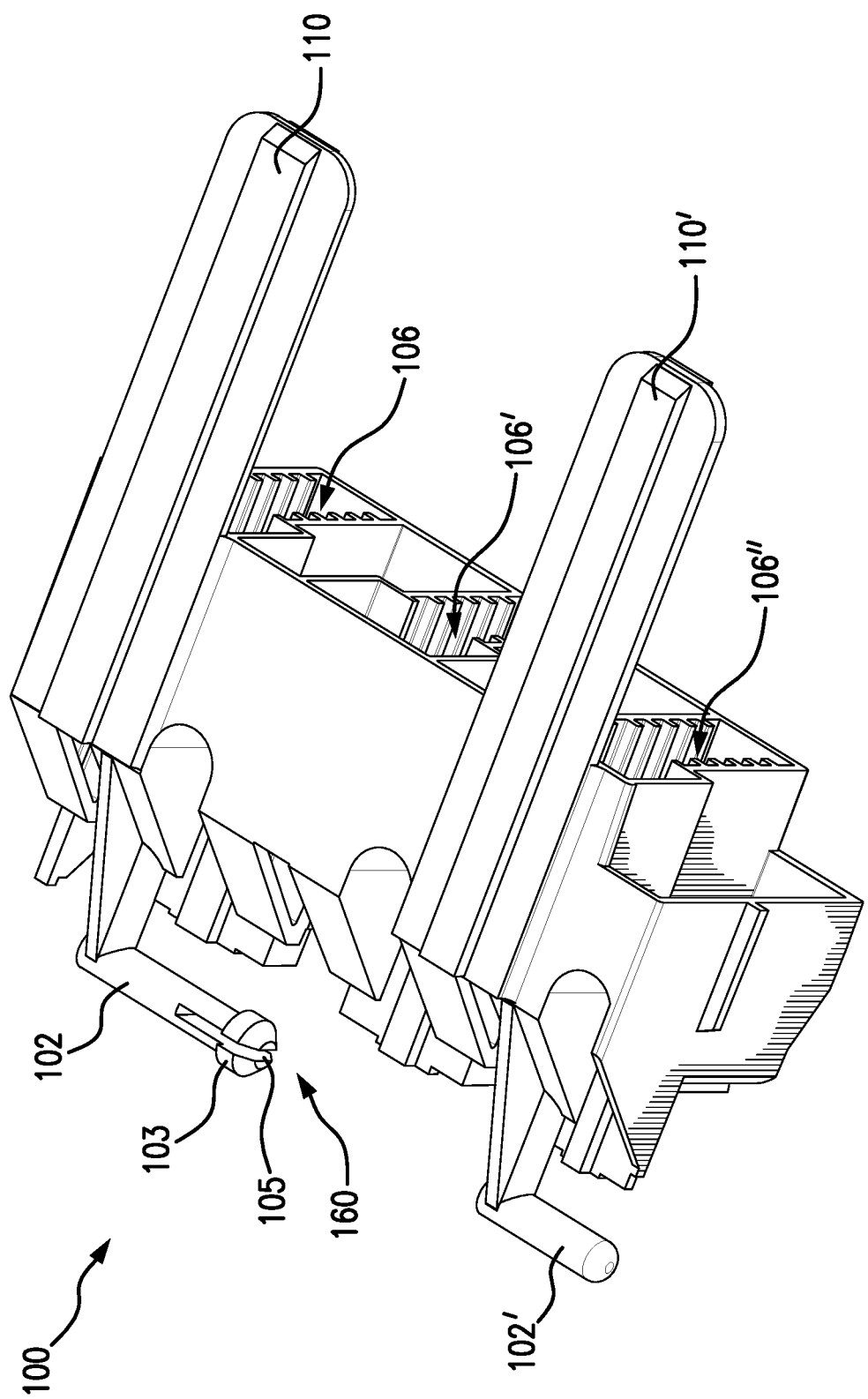
FIG. 3 shows a top perspective view from the right side, of an example embodiment of the invention, showing the safety switch comprising the arc suppression housing and a pivot shaft including a shaft restraint device comprising a shaft head and shaft slot configured for insertion into a pivot socket with snap-in feature, which is mounted on the base of the safety switch.

FIG. 3 shows a top perspective view from the right side, of an example embodiment of the invention, showing the arc suppression housing 100 and the pivot shaft 102, including a shaft restraint device 160. The shaft restraint device 160 comprises a shaft head 103 and shaft slot 105 configured for insertion into the pivot socket 104, which is mounted on the base 150 of the safety switch 50 of FIG. 2. In example embodiments of the invention, the shaft restraint device 160 may also be similarly formed on the other pivot shaft 102' and be configured for insertion into the other pivot socket 104' of FIG. 2.

FIGS. 3A and 3B show a top perspective view from the right side, of an example embodiment of the invention, respectively showing a disassembled (FIG. 3A) and an assembled (FIG. 3B) arrangement of the pivot shaft 102 and the pivot socket 104. The pivot socket 104 has a generally cylindrical shape with a cylindrical axis coincident with the pivot axis 111. The ends of the cylinder are generally perpendicular to the pivot axis 111 and the cylinder has a cylindrical socket hole 107 through it coincident with the pivot axis 111, within which the pivot shaft 102 may be inserted. The shaft restraint device 160 is configured to allow the pivot shaft 102 to be inserted into the socket hole 107 of the pivot socket 104 of the base portion. The shaft restraint device 160 is further configured to restrain the pivot shaft 102 from removal from the pivot socket 104 after insertion. The example embodiment of the pivot socket 104 shown in FIGS. 3A and 3B may be referred to as a side-feeding pivot socket, because the arc suppression housing 100 on which the pivot shaft 102 is mounted, is moved sideways with respect to the base 150, when inserting or feeding the pivot shaft 102 into the socket hole 107 of the pivot socket 104 of the base portion. In this manner, the arc suppression housing 100 is restrained from being removed from the base portion 150 once the pivot shaft 102 has been inserted into the pivot socket 104.

Figure 4:
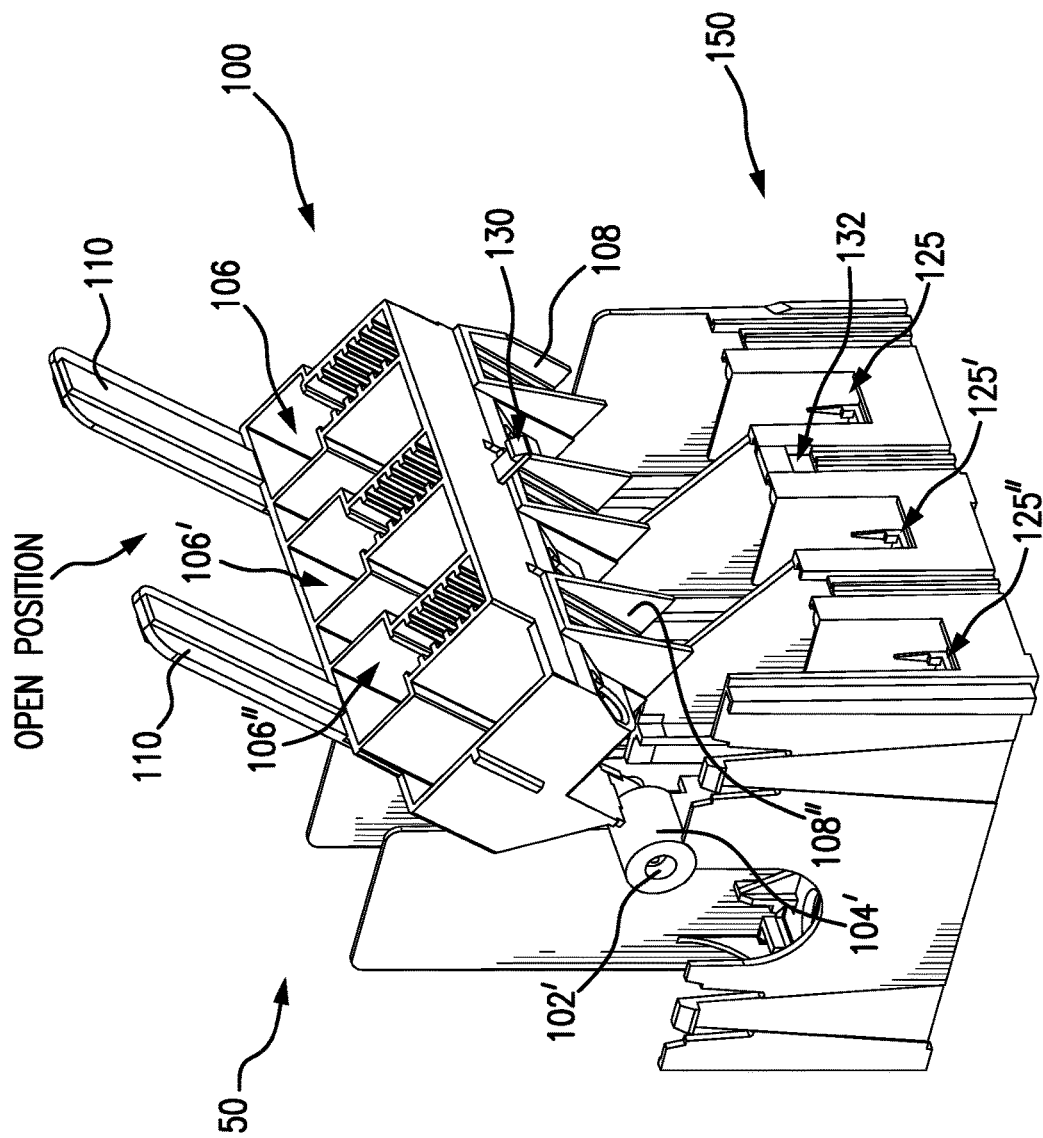
FIG. 4 shows a side perspective view from the right side, of an example embodiment of the invention, showing a partially open position of the arc suppression housing and the base to which it is pivotally mounted to enable an operator to reach the contacts of the electrical switch for wiring or maintaining the contacts.

FIG. 4 shows a side perspective view from the right side, of an example embodiment of the invention, showing a partially open position of the arc suppression housing 100 and the base 150 to which it is pivotally mounted to enable an operator to reach the contacts of the electrical switch for wiring or maintaining the contacts. In example embodiments of the invention, the arc suppression housing 100 further comprises a plurality of arc extinguishing chambers 106, 106', and 106'', each having a respective opening 108, 108', and 108'' configured to face separable contacts 120, 120', and 120'' (shown in FIG. 5) of a corresponding plurality of electrical switches mounted in the base 150, when the arc suppression housing 100 has been rotated about the pivot shaft 102 into the closed position of FIG. 2. A latch 130 on the arc suppression housing 100 engages and securely fastens to a latch seat 132 on the base 150 when the arc suppression housing 100 has been rotated about the pivot shaft 102 into the closed position of FIG. 2.

Figure 5:
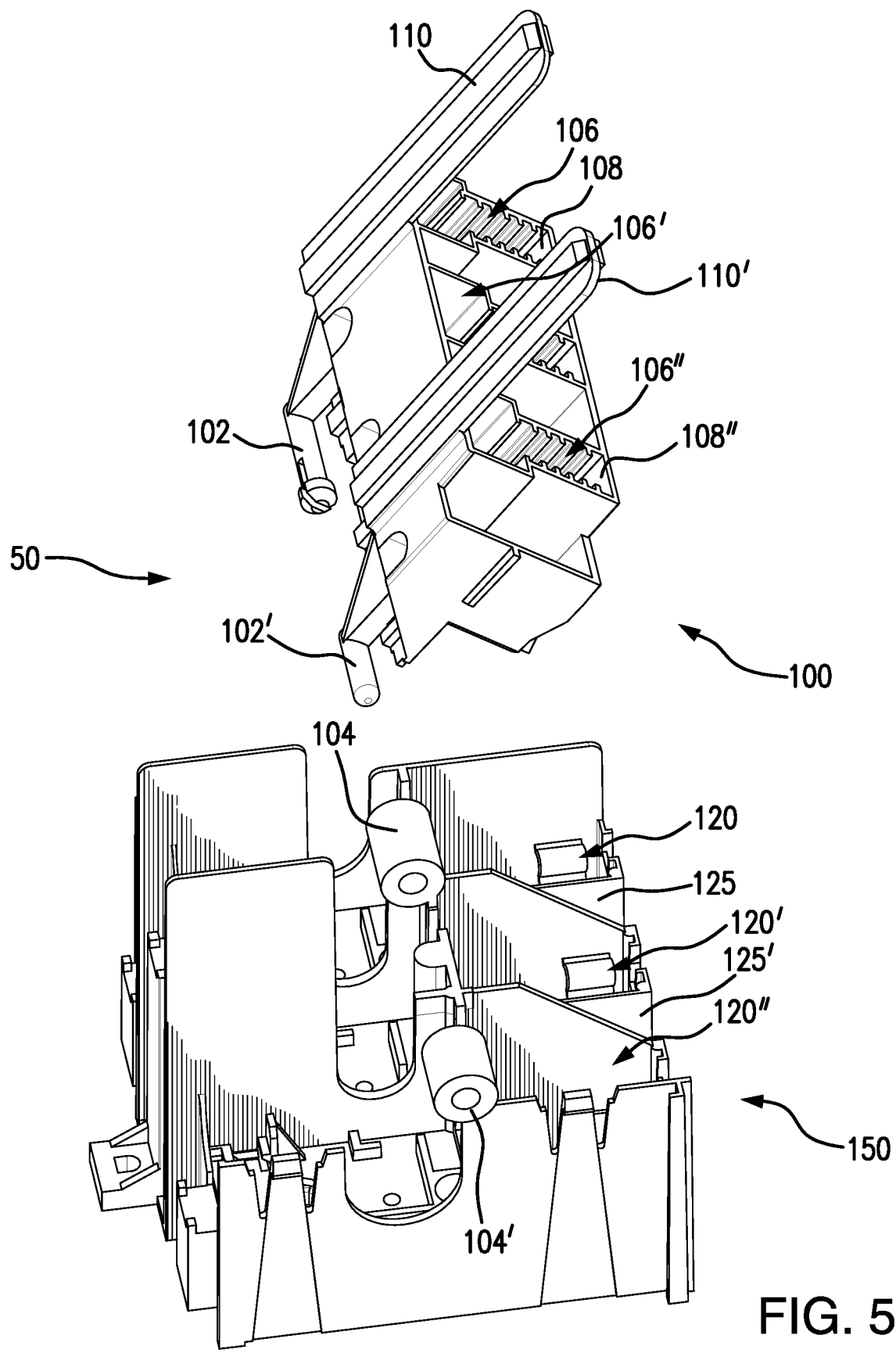
FIG. 5 shows an exploded, top perspective view from the right side, of an example embodiment of the invention, showing the arc suppression housing and the base.

FIG. 5 shows an exploded, top perspective view from the right side, of an example embodiment of the safety switch 50, showing the arc suppression housing 100 and the base 150. The separable switch contacts 120 may be part of a blade or knife-type electrical switch mounted in the base 150 of the arc suppression housing 100. The circuit for each phase may be completed through a pivotable, electrically conductive knife or blade that engages a corresponding pair of electrically conductive jaws contacts 120, 120, and 120'' to electrically connect the line current to the load. The blade and the jaws contacts 120 form the separable contacts of the electrical switch. The blade-type switch may be mounted in the base 150 of the arc suppression housing 100, which may incorporate an insulating base to carry an incoming line terminal for each phase.

In the normally closed position shown in FIG. 2, the arc suppression housing 100 is configured to extinguish an electric arc flash produced by opening the separable contacts of the switch when electrical power is being applied to the switch. When an operator needs to wire the contacts 120 or to clean or repair the contacts 120, electrical power must be removed from the cabinet 170 and from the separable contacts of the switch. The handle 175 on the cabinet 170 may also be actuated to open the switch contacts 120. The access door 180 of the cabinet may then be opened. A latch 130 on the arc suppression housing 100 engages and securely fastens to a latch seat 132 on the base 150 when the arc suppression housing 100 has been rotated about the pivot shaft 102 into the closed position of FIG. 2 To open the arc suppression housing 100 by rotating it about the pivot axis 111 into the open position of FIG. 4, the operator must release the latch 130 from the latch seat 132 on the base 150. The operator may then open the arc suppression housing 100 by rotating it about the pivot axis 111 into the open position of FIG. 4. The interference projections 110 and 110' are configured to block closure of the access door 180 of the electrical cabinet 170, after the arc suppression housing 100 has been rotated about the pivot axis 111 into the open position of FIG. 4, without first rotating the arc suppression housing 100 back into the closed position of FIG. 2. This insures that the arc suppression housing 100 will always be placed by the operator in the closed position while the switch is in operation. With the arc suppression housing 100 now having been rotated into the open position of FIG. 4, the operator has access to wire the contacts 120 or to clean or repair the contacts 120.

The arc suppression housing 100 and the base 150 may be assembled either in the factory or in the field, by inserting the pivot shaft 102 into the pivot socket 104 and the pivot shaft 102' and the pivot socket 104'. The shaft restraint devices on the pivot shaft 102 and on the pivot shaft 102' restrain the arc suppression housing 100 from being removed from the base portion 150 once the pivot shafts 102 and 102' have been inserted into the respective pivot sockets 104 and 104'.

Figure 6:
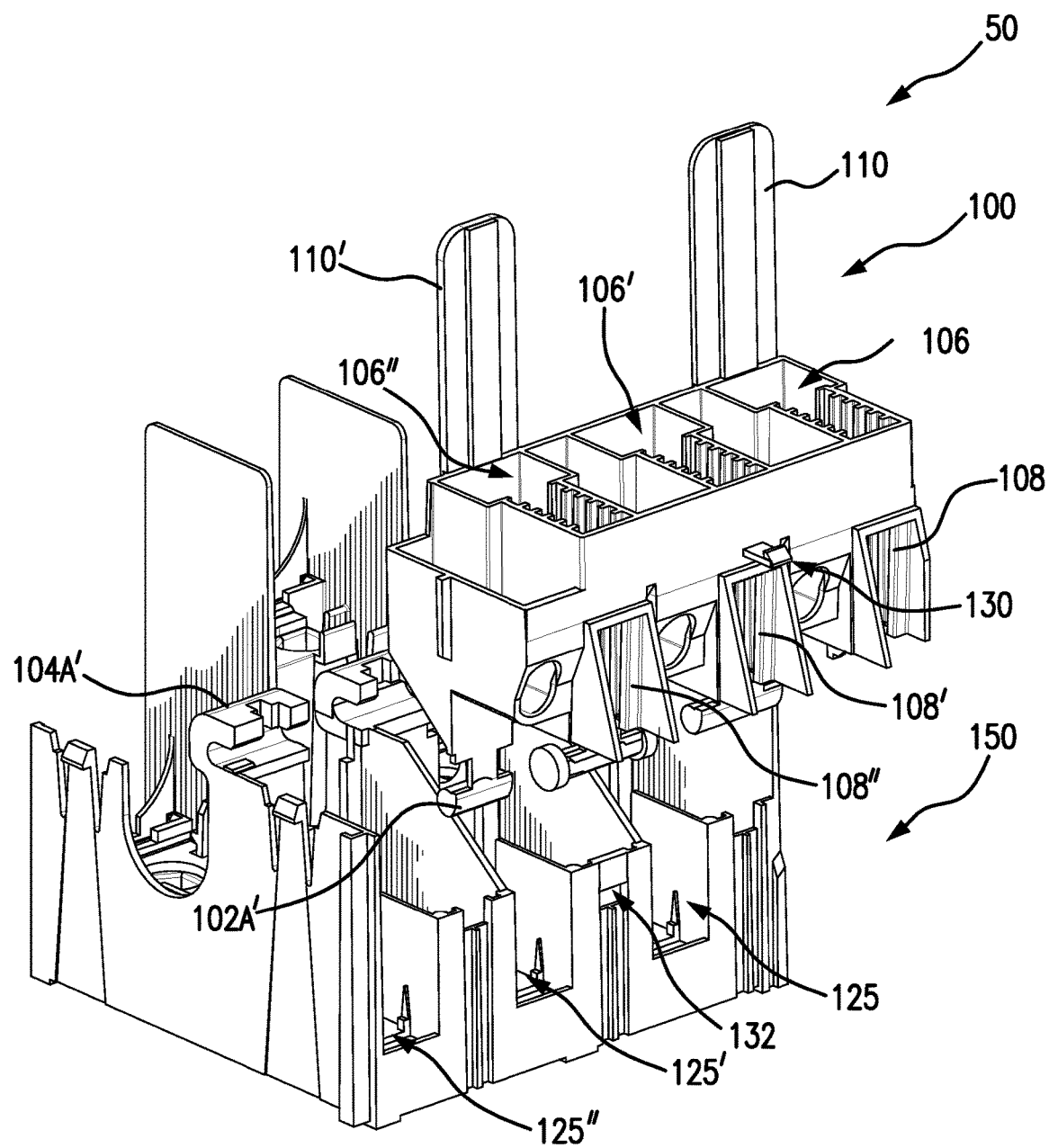
FIG. 6 shows a top perspective view from the right side, of an example alternate embodiment of the invention, showing an open position of the arc suppression housing and the base to which it is pivotally mounted, with a pivot socket that has a generally C-shaped cross section mounted on the base portion. The generally C-shaped cross section forms a slot opening along the length of the pivot socket and a hollow interior space coincident with the pivot axis. The slot opening enables the pivot shaft to be inserted sideways through the slot opening into the hollow interior space by movement in a direction transverse to the pivot axis.

FIG. 6 shows a top perspective view from the right side, of an example alternate embodiment of the invention, showing an open position of the arc suppression housing 100 and the base 150 to which it is pivotally mounted. A pivot socket 104A' has a generally C-shaped cross section mounted on the base portion 150. The generally C-shaped cross section forms a slot opening 112 (shown in FIG. 7) along the length of the pivot socket 104A' and a hollow interior space coincident with the pivot axis 111. The slot opening 112 enables the pivot shaft 102' to be inserted sideways through the slot opening 112 into the hollow interior space by movement in a direction from front to back, transverse to the pivot axis 111.

Figure 7:
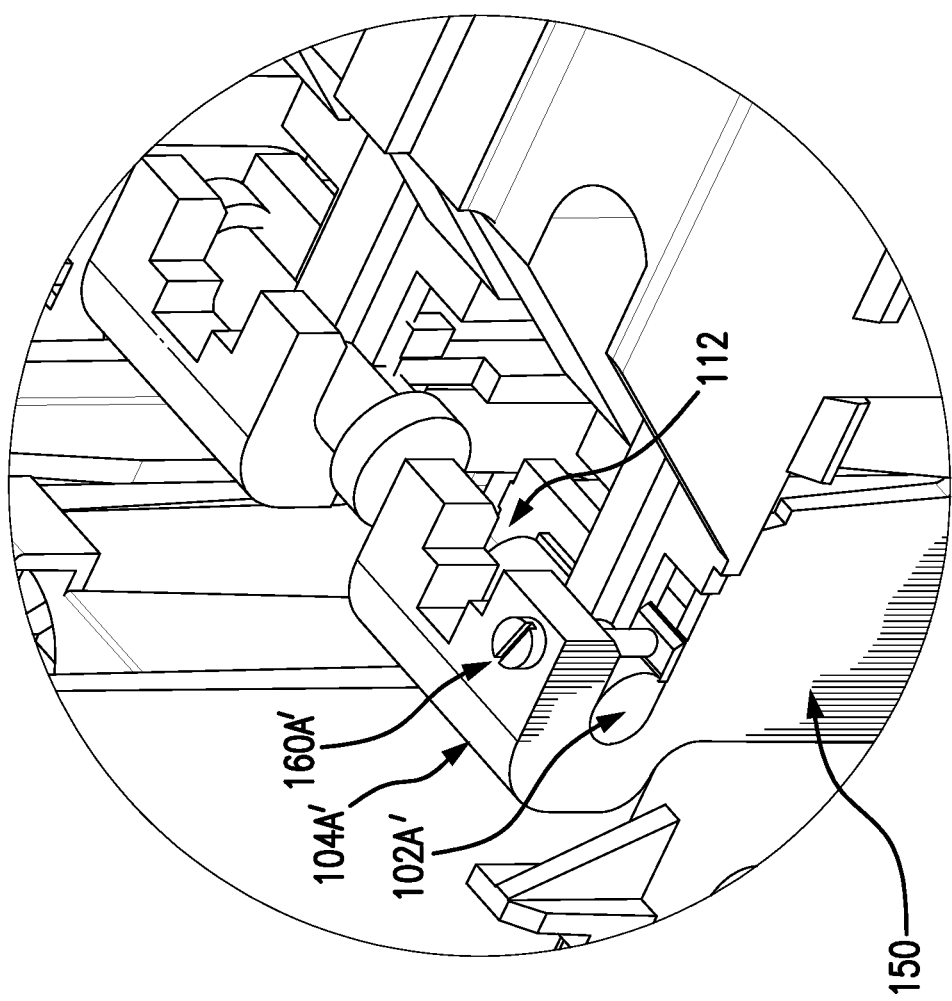
FIG. 7 shows a top perspective view from the right side, of the example alternate embodiment of the invention of FIG. 6, showing the shaft retaining device configured to allow the pivot shaft to be inserted sideways through the slot opening into the hollow interior space. The shaft retaining device is further configured to retain the pivot shaft from removal from the hollow interior space through the slot opening, thereby restraining the arc suppression housing from being removed from the base portion once the pivot shaft has been inserted into the pivot socket.

FIG. 7 shows a top perspective view from the right side, of the example alternate embodiment of the invention of FIG. 6, showing a shaft retaining device 160A' configured to allow the pivot shaft 102' to be inserted sideways through the slot opening 112 into the hollow interior space. The shaft retaining device 160A' is further configured to retain the pivot shaft 102' from removal from the hollow interior space through the slot opening 112. The example embodiment of the pivot socket 104A' shown in FIG. 7 may be referred to as a front-feeding pivot socket, because the arc suppression housing 100 on which the pivot shaft 102 is mounted, is moved from front to back with respect to the base 150, when inserting or feeding the pivot shaft 102' through the slot opening 112 into the hollow interior space of the pivot socket 104A' of the base 150. In this manner, the arc suppression housing 100 is restrained from being removed from the base 150 once the pivot shaft 102' has been inserted sideways through the slot opening 112 into the hollow interior space pivot socket 104A'.

Although specific example embodiments of the invention have been disclosed, persons of skill in the art will appreciate that changes may be made to the details described for the specific example embodiments.

The invention claimed is:

1. An arc protection system for an electrical switch mounted in an electrical cabinet, comprising:
   an arc suppression housing pivotally mounted on a pivot in the electrical cabinet, the housing including a top wall and opposing side walls surrounding an arc extinguishing chamber having a bottom opening configured to face separable contacts of the electrical switch mounted in the cabinet when the housing has been rotated on the pivot into a closed position, a rotation being about a pivot axis generally perpendicular to the side walls, the arc extinguishing chamber configured to extinguish an electric arc having been produced by opening the separable contacts when the housing is in the closed position; and
   an interference mechanism mounted on the top wall of the arc suppression housing, configured to prevent closure of an access door of the electrical cabinet, after the housing has been rotated about the pivot axis of the pivot into an open position configured to enable operator access to the separable contacts of the electrical switch.

2. The arc protection system of claim 1, wherein the interference mechanism is an extension projecting from the top wall of the arc suppression housing, configured to block closure of the access door of the electrical cabinet to insure a closed positioning of arc suppression housing prior to closure of the access door.

3. The arc protection system of claim 1, further comprising:
   the arc suppression housing supported by a pivot shaft mounted on the arc suppression housing and coincident with the pivot axis; and
   a base portion fastened to the electrical cabinet, to which the separable contacts of the electrical switch are mounted, the base portion including a pivot socket configured to receive the pivot shaft of the arc suppression housing, the pivot socket configured to allow the housing to be rotated about the pivot axis between the closed position and the open position.

4. The arc protection system of claim 3, further comprising:
   the pivot socket having a generally cylindrical shape with a cylindrical axis coincident with the pivot axis, with ends generally perpendicular to the pivot axis, and having a cylindrical hole through the pivot socket it coincident with the pivot axis, within which the pivot shaft can be inserted; and
   the pivot shaft having a shaft restraint device on one end, configured to allow the pivot shaft to be inserted into the hole of the pivot socket and further configured to restrain the pivot shaft from removal from the hole of the pivot socket, thereby restraining the arc suppression housing from being removed from the base portion once the pivot shaft has been inserted into the hole of the pivot socket.

5. The arc protection system of claim 3, further comprising:
   the pivot socket having a generally C-shaped cross section forming a slot opening parallel to the pivot axis and a hollow interior space coincident with the pivot axis, the slot opening enabling the pivot shaft to be inserted sideways through the slot opening into the hollow interior space by movement in a direction transverse to the pivot axis; and the pivot socket including a shaft retaining device configured to allow the pivot shaft to be inserted sideways through the slot opening into the hollow interior space so as to be coincident with the pivot axis, the shaft retaining device further configured to retain the pivot shaft from removal from the hollow interior space through the slot opening, thereby restraining the arc suppression housing from being removed from the base portion once the pivot shaft has been inserted sideways into the pivot socket.

6. The arc protection system of claim 1, wherein the interference mechanism prevents closure of the access door of the electrical cabinet, until the housing has been rotated about the pivot into the closed position.

7. The arc protection system of claim 1, wherein the housing further comprises a plurality of arc extinguishing chambers, each having an opening configured to face separable contacts of a corresponding plurality of electrical switches mounted in the cabinet when the housing has been rotated about the pivot into the closed position.

8. An arc protection system for an electrical switch mounted in an electrical cabinet, comprising:

an arc suppression housing in the electrical cabinet, the arc suppression housing including a pivot shaft;

a base portion fastened to the electrical cabinet, including a pivot socket configured to receive the pivot shaft of the arc suppression housing, the pivot socket configured to allow the arc suppression housing to be rotated about a pivot axis of the pivot shaft between a closed position and an open position;

the electrical switch mounted in the base portion, the electrical switch including separable contacts;

the arc suppression housing including a top wall and opposing side walls surrounding an arc extinguishing chamber having a bottom opening configured to face the separable contacts of the electrical switch when the arc suppression housing has been rotated about the pivot axis into the closed position, the arc extinguishing chamber configured to extinguish an electric arc having been produced by opening the separable contacts when the arc suppression housing is in the closed position; and an interference mechanism mounted on the top wall of the arc suppression housing, configured to prevent closure of an access door of the electrical cabinet, after the arc suppression housing has been rotated about the pivot axis into the open position configured to enable operator access to the separable contacts of the electrical switch.

9. The arc protection system of claim 8, wherein the interference mechanism is an extension projecting from the top wall of the arc suppression housing, configured to block closure of the access door of the electrical cabinet to insure a closed positioning of arc suppression housing prior to closure of the access door.

10. The arc protection system of claim 8, wherein the interference mechanism prevents closure of the access door of the electrical cabinet, until the arc suppression housing has been rotated about the pivot axis into the closed position.

11. The arc protection system of claim 8, wherein the arc suppression housing further comprises a plurality of arc extinguishing chambers, each having an opening configured to face separable contacts of a corresponding plurality of electrical switches mounted in the base portion when the arc suppression housing has been rotated about the pivot axis into the closed position.

12. A method for accessing an electrical switch protected by an arc protection system in an electrical cabinet, comprising:

removing electrical power from the cabinet and from the electrical switch;

opening an access door of the electrical cabinet;

releasing a latch on an arc suppression housing, from a latch seat on a base portion to which the arc suppression housing is pivotally mounted about a pivot axis;

opening the arc suppression housing by rotating the arc suppression housing about the pivot axis of the base portion into an open position;

blocking closure of the access door with interference projections on the arc suppression housing after the arc suppression housing has been rotated about the pivot axis into the open position, to insure that the arc suppression housing will be replaced by an operator in the closed position while the switch is in operation; and accessing the electrical switch while the arc suppression housing is in the open position.

\* \* \* \* \*